S. H. WADE.
Butter Worker.
No. 65,315.
Patented May 28, 1867.
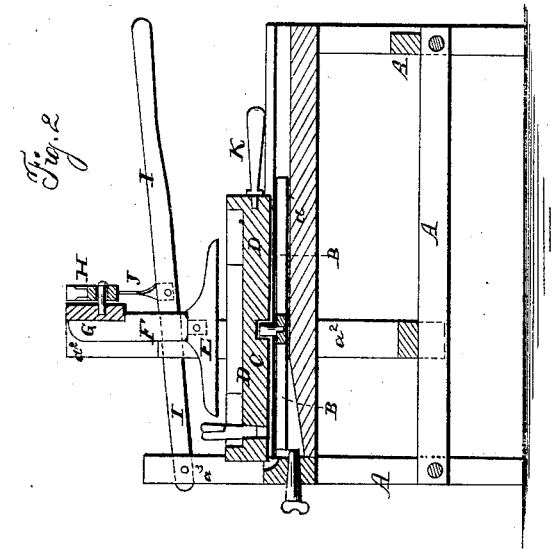
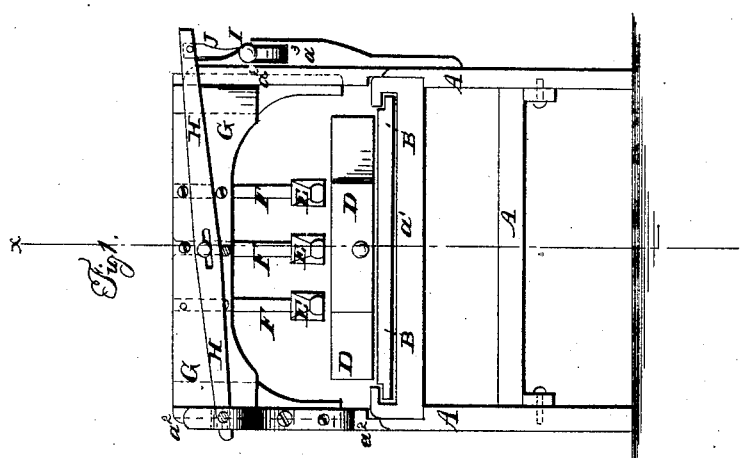

United States Patent Office.

S. H. WADE, OF MONTGOMERY CENTRE, VERMONT.

Letters Patent No. 65,315, dated May 28, 1867.

BUTTER-WORKER.

*The Schedule referred to in these Letters Patent and making part of the same.*

TO ALL WHOM IT MAY CONCERN:

Be it known that I, S. H. WADE, of Montgomery Centre, in the county of Franklin, and State of Vermont, have invented a new and improved Butter-Worker; and I do hereby declare that the following is a full, clear, and exact description thereof, which will enable others skilled in the art to make and use the same, reference being had to the accompanying drawings, forming part of this specification, in which—

Figure 1 is an end view of my improved butter-worker.

Figure 2 is a vertical longitudinal section of the same, taken through the line $x\ x$, fig 1.

Similar letters of reference indicate like parts.

My invention has for its object to furnish an improved machine for working butter, cheap, simple in construction, durable, not liable to get out of order, and which will do its work quickly and thoroughly; and it consists in the combination of the pressers, sliding-beam, and operating levers with each other and with the frame of the machine, and in the combination of the pivoted table and sliding frame with each other and with the frame of the machine; the whole being constructed and arranged as hereinafter more fully described.

A is the frame of the machine, which should be made of such a height that the machine can be conveniently operated. The top $a'$ of the frame A is a close platform, sloping slightly towards the forward end, where there is formed a hole, closed with a plug, for drawing off the buttermilk or water when desired. The sides of the frame A that rise above the surface of the platform $a^1$, are grooved longitudinally, as shown in figs. 1 and 2, for the reception of the tongues of the sliding frame B. From the centre of the frame B projects a pin C, to which the table D is pivoted, by having a socket formed in its lower side for the reception of the said pin, as shown in fig. 2. The pivoted table D may be made polygonal in form, or round, as may be desired; but I prefer to make it polygonal, as that form enables the pressers to be worked closer to the sides of the said table. The sides of the table D project upward, so as to form a rim to confine the butter while being worked, and also to confine the water or brine when the butter is worked in that manner. It also has a hole through its bottom, at the forward side, stopped with a plug, through which the water or brine may be drawn off, when desired, or which may be left open, allowing the buttermilk or brine to flow off as it is worked from the butter. E are the pressers, one or more of which are attached to the lower ends of the arms F, by which they are connected to the sliding beam G. The pressers E may be rigidly attached to the ends of the arms F, or they may be so attached as to have a slight movement upon their points of attachment. The ends of the beam G slide up and down in grooves in the vertical posts $a^2$, attached to the sides of the frame A. H is a lever, one end of which is pivoted to one of the posts $a^2$, and the middle part of which is pivoted to the middle part of the sliding beam G by a pin or bolt passing through the said beam and through a slot in the said lever, as shown in fig. 1. I is a lever, one end of which is pivoted to the upwardly projecting end of the post $a^3$, and its middle part is connected to the end of the lever H by the connecting-rod J. K is a handle attached to the side of the pivoted table D, for convenience in operating it while working the butter, so that a different part of the butter may be operated upon by the presses at each stroke.

What I claim as new, and desire to secure by Letters Patent, is—

1. The combination of the pressers E, sliding beam G, and operating levers H and J, with each other and with the frame of the machine, substantially as herein shown and described, and for the purpose set forth.

2. The combination of the pivoted table D and sliding frame B with each other, and with the frame of the machine, substantially as herein shown and described and for the purpose set forth.

S. H. WADE.

Witnesses:
    B. R. WILLIS,
    S. S. WILBUR.